United States Patent [19]

Montagroni

[11] 3,866,528

[45] Feb. 18, 1975

[54] APPARATUS FOR EXTRACTING JUICE FROM CITRUS FRUIT

[76] Inventor: Nevio Montagroni, 4, Via G. Organi, Forli, Italy 47100

[22] Filed: Jan. 22, 1973

[21] Appl. No.: 325,252

[30] Foreign Application Priority Data
Feb. 12, 1972 Italy .................................. 12003/72
Feb. 12, 1972 Italy .................................. 12004/72

[52] U.S. Cl. ................... 99/495, 99/501, 99/509, 100/98
[51] Int. Cl. ....... A23n 1/02, A47j 19/02, B30b 9/02
[58] Field of Search ............. 99/495, 496, 501–502, 99/503–504, 505–506, 507–508, 509–510, 511–512, 513; 100/98

[56] References Cited
UNITED STATES PATENTS

| | | | |
|---|---|---|---|
| 1,124,797 | 1/1915 | Park.................................. | 99/501 X |
| 2,346,561 | 4/1944 | Delay................................ | 99/495 X |
| 2,540,345 | 2/1951 | Pipkin............................... | 99/495 X |
| 2,780,988 | 2/1957 | Belk et al......................... | 100/98 R X |
| 3,717,084 | 2/1973 | Robbins et al.................... | 99/495 X |

Primary Examiner—Robert W. Jenkins
Assistant Examiner—Arthur O. Henderson
Attorney, Agent, or Firm—Larson, Taylor and Hinds

[57] ABSTRACT

The citrus fruit to be processed is placed inside the cavity of a lower cup provided with circumferentially spaced inwardly directed radial fingers. The lower cup is moved upwardly towards a stationary opposite upper cup provided with complementary fingers. The fruit is compressed between the cups, an opening is cut in its summit and suction is exerted through said opening, while a blade ruptures the pulp inside of the fruit. As interdigitation of the fingers of the cups proceeds, the fruit is compressed and the juice is extracted.

4 Claims, 6 Drawing Figures

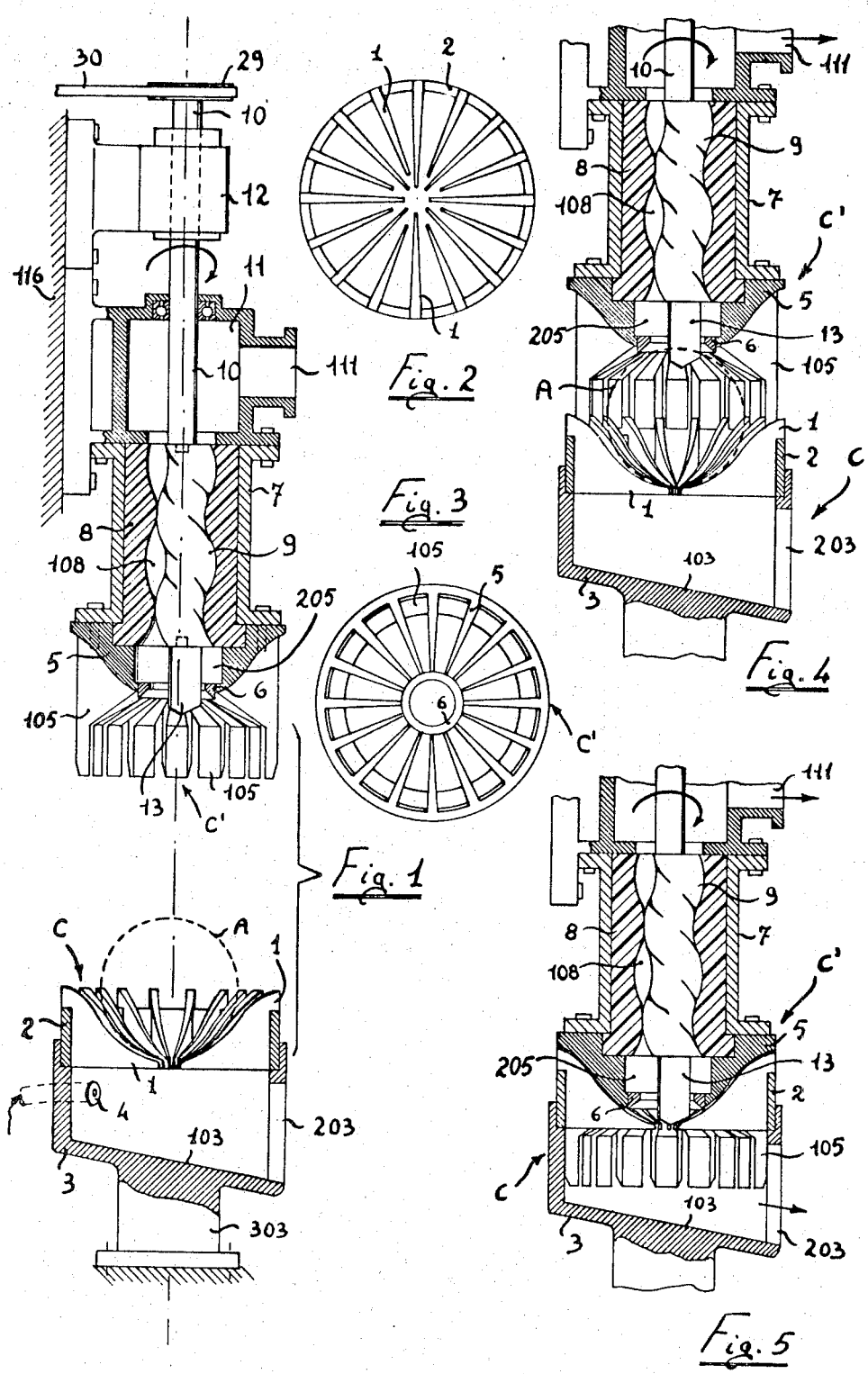

3,866,528

APPARATUS FOR EXTRACTING JUICE FROM CITRUS FRUIT

BACKGROUND AND SUMMARY OF THE INVENTION

This invention relates to an improved apparatus for extracting juice from whole citrus fruit such as oranges, grapefruits, lemons and limes.

There are known fruit processing machines in which the whole fruit is subjected to the juice extracting operation. These machines operate on the principle of forming an opening in the rind or peel of the fruit and exerting compressive forces on the fruit so as to expel the juice from the fruit through said opening.

The apparatus of the present invention constitute an improvement over the prior art, in consideration of the fact that in accordance with the invention, the juice is extracted by the whole citrus fruit not only due to the action of the compressive forces exerted on the fruit which cause the expulsion of the juice through the opening made in the rind or peel, but also thanks to the fact that a suction is exerted through the said opening in the peel of the fruit, while means are provided which rupture the pulp inside of the fruit, thus favoring the extraction of the juice and pulp. Therefore, thanks to the suction, the extraction of the juice takes place in a more efficient and quick manner. Moreover, the juice, which has been extracted under suction, does not come into contact with the outer atmosphere, thus avoiding any spoiling of its taste, freshness and inherent qualities. As a matter of fact, as it will better appear in the course of the specification, the whole juice extracting and purifying operation can take place under vacuum with all advantages deriving therefrom.

The invention will be better understood from the following description of one preferred embodiment of same, when considered in connection with the accompanying drawings, and the novel features will be particularly pointed out in the appended claims.

IN THE DRAWINGS

FIG. 1 is a side view, with parts in section, of a juice extracting unit according to the invention.

FIG. 2 is a top plan view of the lower cup element of the unit shown in FIG. 1.

FIG. 3 is a bottom plan view of the upper cup element of the unit shown in FIG. 1.

FIGS. 4 and 5 are views similar to that of FIG. 1, showing the juice extracting unit in two different steps of its operation.

DESCRIPTION OF THE PREFERRED EMBODIMENT

Figure 6:
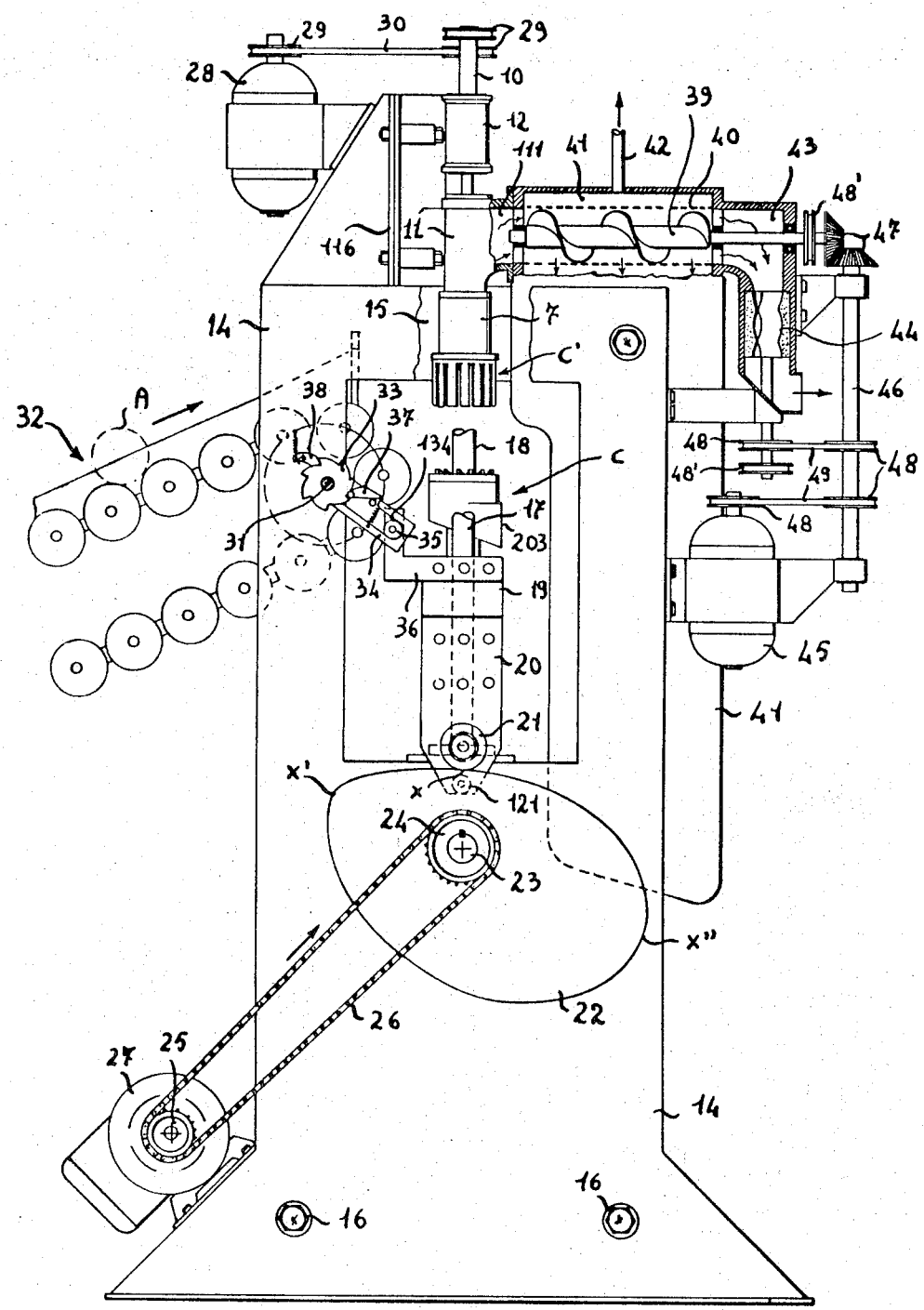
FIG. 6 shows in side elevation and with parts in section an apparatus for extracting juice from whole citrus fruit incorporating the juice extracting unit in accordance with the invention.

With particular reference to FIGS. from 1 to 3, it can be noted that the citrus fruit A, from which the juice is to be extracted, is positioned as a whole fruit in the upwardly directed concavity of a cup element C which has its axis vertical. This concavity is formed by a series of fingers or ribs 1, shaped as shown in FIGS. 1 and 2 and constructed for example of steel or aluminium.

The fingers 1 are fixed on a ring 2 equally spaced circumferentially and extend radially inwardly, in such a manner that each pair of fingers is separated by a slot which is wider than one of the fingers 1. The ring 2 is fixed onto the upper end of a hollow cylindrical body 3, the bottom 103 of which is suitably inclined, said cylindrical body 3 being provided with a discharge opening 203 in correspondence of the lower section of the inclined bottom 103. The radical slots defined by fingers 1 communicate with the inside of cylindrical body 3. On the cylindrical wall of body 3, below ring 2, there are provided one or more nozzles 4, which are directly radially and towards the discharge opening 203, which nozzles are connected to a source of fluid under pressure.

The body 3 is provided with a lower supporting structure 303, which is adapted to be fixed onto a suitable vertically movable supporting frame, as it will be described after.

Above cup C, in axial alignment and at a suitable distance from same, there is provided a fixed upper cup assembly C', which comprises a bulb element 5 so shaped as to match the concavity defined by fingers or ribs 1 of cup C. Integrally with bulk 5 there are obtained the fingers or ribs 105, shaped as shown in FIGS. 1 and 3, radially directed and circumferentially equispaced. These latter fingers 105 are constructed of such a size as to exactly pass through the slots defined by the fingers 1 of the lower cup C and within the circumference defined by ring 2 of said cup C.

Bulb 5 is provided with an axial bore 205, onto the lower end of which there is mounted, for example by screwing, a ring 6 having a cutting edge which projects out of the bore 205 and of the surface of bulb 5.

The upper cup c' is fixed in sealing relationship, for example by means of screws, to the cylindrical body 7 of a suction unit comprising a stator element 8 made of elastic non-toxic material, provided with an inner cavity 108 helically shaped, and inside which there is axially rotatable a rotor element 9 preferably made of steel and having also a suitable helical shape.

Rotor 9 is connected axially by its upper end to the lower end of a driving shaft 10 which passes, with the interposition of suitable sealing elements, through a collecting chamber 11 which is provided with a discharge opening 111.

Driving shaft 10 is guided and supported by a supporting member 12, fixed to a portion 116 of the machine frame, and is driven into rotation through pulley 29 by driving belt 30. It is here omitted a description of the details relating to the shape of stator 8, its cavity 108 and of rotor 9 of the suction unit, since they are of known type, and in any case easily conceivable by persons skilled in the art. It is to be appreciated, in any case, that, following to rotation in the correct sense of rotor 9, there will be created a suction force directed from bore 205 of bulb 5, which communicates with the lower opening of stator 8, to the collecting chamber 11, and eventually to the discharge opening 111 of this chamber.

Rotor 9 is provided at its lower end with an axially directed rotary rupturing means in the form of blade 13 having such a length as to project out of bore 205 and ring 6 of bulb 5, but obviously not to touch the inner section of fingers 1 of lower cup C, whenever the upper and lower cups have reached the fully closed position shown at FIG. 5, where full interdigitation of the fingers of both cups has occurred. It is to be further noted to this respect that the fingers 1 of lower cup C, while as said are radially directed inwardly, do not reach the center of the cup C itself, thus leaving a round free space, as it can be appreciated by looking at FIG. 2.

The operation of the just described juice extracting device is as follows:

The citrus fruit, for example an orange, is deposited, by suitable feeding means, into the lower cup C. The lower cup C is brought, from its lowermost position (FIG. 1) upwardly, to the position shown in FIG. 4. At this point, the fingers 105 of upper cup C' begin to interdigitate with the fingers of lower cup C, i.e. there is a penetration of fingers 1 into the slots between said fingers 105. It appears evident that the fruit is blocked firmly between the two cups. Contemporarily, the blade 13 which rotates integrally with the rotor 9 of the suction unit, perforates the peel of the fruit in the zone facing bore 205 of the suction unit, while the ring 6 with its lower cutting edge, makes a neat incision in the same portion of the fruit peel, thus establishing a tight seal connection between the interior of the fruit (which has been cut by rotary blade 13 in the zone within the ring 6) and the bore 205, which is connected with the suction unit, so that any suction originated in bore 205 due to the action of rotor 9 rotating inside stator 8 is exerted only with respect to the interior of the fruit. In this manner, when the lower cup C continues its upward movement, the fruit is squeezed between the two intersecting cups, and the juice and pulp are sucked from the interior of the fruit, through the suction elements 8, 9, up into the collecting chamber 11 and successively out of the discharge opening 111.

The blade 13, which is continuously rotated since it is integral with the suction rotor 9, provides to the rupture of the pulp inside of the fruit, thus favoring the formation of juice, or anyhow more fluid matter (pulp and juice) which is sucked in an easier way by the said suction unit.

The interdigitation of the cups proceeds, until the fingers of one cup have fully penetrated into and passed beyond the fingers of the other (see FIG. 5). At this stage the peel or rind of the fruit is cut by the action of the interdigitating fingers and it is discharged downwardly into the hollow cylindrical body 3. The discharge takes place downwardly, since the surface covered by the fingers 105 of upper cup C' is greater than the corresponding surface of fingers 1 of lower cup C. From the cylindrical body 3, the peel and oil are discharged through discharge opening 203. To this purpose, a jet of fluid may be supplied through nozzles 4, in order to favor the discharge and keep the hollow space free.

From the above, the following two very important characteristic features appear evident:

a. the juice and pulp are extracted by suction, and therefore no contact of the juice with the air takes place;

b. the juice is extracted from the upper portion of the fruit which is squeezed, so that the peel oils are discharged along the exterior of the peel of the fruit, downwardly, without spoiling the quality of the extracted juice.

Referring now to FIG. 6, where there is illustrated a machine particularly adapted to utilize the extracting device above disclosed, we note that the machinne comprises a frame structure made of two parallel upright side members 14, 15 connected by transverse tie bars 16. On each one of side members 14, 15 there is fixed a vertical guide rod 17, resp. 18 onto which there is slidably mounted a horizontal beam 19 which carries in its upper face a suitable number of lower cups C.

The ends of the beam 19 project out of suitable openings provided in the side members 14, 15 and carry bracket members 20 directed downwardly and provided with a cam follower 21 (in the form of a ball bearing) which bears onto the circumferential profile of a cam 22 substantially shaped as shown in FIG. 6. The cams 22 are provided in the number of two, one for each side of the frame, and are connected the one to the other through a shaft 23 which is rotatably supported by the said side members 14, 15. The shaft 23 is rotated by motor 27 through a suitable chain drive 24, 25, 26.

On the upper portion of the machine frame, fixed on the transverse horizontal beam 116, there are provided, in axial alignment with the lower cups C, as many upper cups C', with the respective suction units.

It will be appreciated that rotation of the cams 22 in clockwise direction will cause the following vertical displacements of the lower cups C:

a. Section X—X' of the cams: swift upward movement of the cups C in direction of the upper cups C';

b. Section X'–X'': slow upward movement, with progressive interdigitation of the cups;

c. Section X''–X: quick downward movement of cups C away from cups C'.

A suitable roller 121 may be provided below the cam follower 21, adapted to cooperate with an inner design of cams 22, in order to positively assist the downward or return movement of beam 19 carrying the lower cups C.

A motor 28, provided in the upper section of the machine, drives, through pulleys 29 and belt 30, the shafts 10 of each suction unit of the upper cups C'.

The discharge opening 111 of each suction unit is connected to a chamber 21 inside which there is created vacuum, for example by suitable pump means, through duct 42. Inside chamber 41 there is provided a cylindrical perforated jacket 40, inside which there rotates the screw feeder 39. More particularly, jacket 40 connects directly opening 111 with a discharge pump 44, through an intermediate duct 43. Discharge pump 44 is preferably constructed in the same manner as the suction unit for extracting the juice and pulp from the fruit. The drive to the screw feeder 39 and to the rotor of the discharge pump 44 is imparted by motor 45 through pulleys 48, belt 49, shaft 46 and bevel gears 47.

A feeding device is also provided, for successively and orderly feeding the fruits to the lower cups C.

This feeding device substantially comprises a conveyor 32, preferably of the roller type, provided with partitions, of known type, by which the fruits may be conveyed, in several rows and the one after the other, to the single receiving lower cups C.

The conveyor 32 is operated by shaft 31 onto which it winds, and which is rotatably supported by the side members 14, 15. Shaft 31 is caused to intermittently rotate in synchronous relation with the movement of cups C by a ratchet wheel device, constructed and operating as follows: a ratchet wheel 33 is keyed onto shaft 31 and is caused to rotate in clockwise direction by the downward movement of a lever 34 connected, through roller 35 which engages a slot in said lever, to the bracket member 36 integral with horizontal beam 19. A pawl 37 actuates the ratchet wheel in clockwise direction, while it leaves same free in the contrary direction (ascending movement of lever 34). A further pawl 38 is provided as non-return means for avoiding any anti-clockwise rotation of wheel 33. It appears evident that each downward stroke of beam 19 will cause a stepwise rotation of wheel 33 and the consequent deposition, by feeding conveyor 32 actuated by said wheel, of a single fruit A in each lower cup C.

The operation of the just described machine is evident:

A fruit A is loaded, as above explained, at each downward movement of beam 19, on a corresponding lower cup C. The lower cup C carrying the fruit is successively brought upwards until interdigitation of the fingers of the lower and corresponding upper cup C' occurs. At this stage, the juice and pulp are sucked from the fruit, as already explained, and pumped into chamber 11 to the discharge opening 111. From this discharge opening the juice and pulp are conveyed, by screw conveyor 39, through the perforated jacket 40 in chamber 41. A compression of the pulp takes place, whereby all the juice is extracted and passes through jacket 40 in the vacuum chamber 41, from which it can be tapped off by suitable means (not shown). The exhausted pulp is pushed in the chamber 43 and hence it is pumped, by pump 44, to a final discharge. The pump 44 ensures the necessary tight sealing of vacuum chamber 41 with respect to the outer atmosphere.

It will be appreciated that the whole processing of the fruit has taken place in such a manner as to avoid any contact of the extracted juice with the air.

It is believed that the invention will have been understood from the foregoing detailed description of one preferred embodiment. Changes in the details of construction may be resorted to without departing from the spirit of the invention, and it is accordingly my intention that no limitations be implied and that the hereto annexed claims be given the broadest interpretation to which the employed language fairly admits.

I claim:

1. A device for processing whole citrus fruit comprising:
   — an upper cup arranged with its axis vertical and having a bowl-like cavity directed downwardly;
   — a lower cup coaxial with said upper cup and having a bowl-like cavity directed upwardly;
   — each of said bowl-like cavities having a multiplicity of narrow ribs separated by correspondingly narrow slots, the ribs of each cup being aligned with the slots of the opposite cup;
   — a tubular cutting edge;
   — rotary rupturing means arranged within said tubular cutting edge and capable of extending a substantial length into the cavity of the said stationary upper cup;
   — suction means being provided to exert suction within said tubular cutting edge;
   — means for moving the lower cup towards and away from said upper cup, said tubular cutting edge being arranged at the center of the upper cup so that upon upward movement of said lower cup said cutting edge makes a neat incision in the peel of said citrus fruit and establishes a tight seal connection between the interior of the fruit and the suction means.

2. A device for processing whole citrus fruit comprising:
   — an upper cup arranged with its axis vertical and having a bowl-like cavity directed downwardly;
   — a lower cup coaxial with said upper cup and having a bowl-like cavity directed upwardly;
   — each of said bowl-like cavities having a multiplicity of narrow ribs separated by correspondingly narrow slots, the ribs of each cup being aligned with the slots of the opposite cup;
   — a tubular cutting edge;
   — rotary rupturing means arranged within said tubular cutting edge and capable of extending a substantial length into the cavity of the said stationary upper cup;
   — suction means being provided to exert suction within said tubular cutting edge;
   — means for moving the lower cup towards and away from said upper cup, said tubular cutting edge being arranged at the center of the upper cup so that upon upward movement of said lower cup said cutting edge makes a neat incision in the peel of said citrus fruit and establishes a tight seal connection between the interior of the fruit and the suction means;
   — said suction means comprising a stationary stator made of elastic material having a helically shaped hollow cavity passing therethrough, one end of said cavity communicating with the tubular cutting edge, and the opposite end with a discharge chamber for the sucked juice and pulp, and a rotor, rotatably mounted inside said cavity of the stator, the axis of rotation of which is vertical and coincident with the axis of the upper cup, said rotor carrying at its lower end a cutting blade integral in rotation thereto, said cutting blade projecting out of the tubular cutting edge into the cavity of the upper cup.

3. A device for processing whole citrus fruit comprising:
   — an upper cup arranged with its axis vertical and having a bowl-like cavity directed downwardly;
   — a lower cup coaxial with said upper cup and having a bowl-like cavity directed upwardly;
   — each of said bowl-like cavities having a multiplicity of narrow ribs separated by correspondingly narrow slots, the ribs of each cup being aligned with the slots of the opposite cup;
   — a tubular cutting edge;
   — rotary rupturing means arranged within said tubular cutting edge and capable of extending a substantial length into the cavity of the said stationary upper cup;
   — suction means being provided to exert suction within said tubular cutting edge;
   — means for moving the lower cup towards and away from said upper cup, said tubular cutting edge being arranged at the center of the upper cup so that upon upward movement of said lower cup said cutting edge makes a neat incision in the peel of said citrus fruit and establishes a tight seal connection between the interior of the fruit and the suction means;
   — said suction means comprising a stationary stator made of elastic material having a helically shaped hollow cavity passing therethrough, one end of said cavity communicating with the tubular cutting edge, and the opposite end with a discharge chamber for the sucked juice and pulp, and a rotor, rotatably mounted inside said cavity of the stator, the axis of rotation of which is vertical and conicident with the axis of the upper cup, said rotor carrying at its lower end a cutting blade integral in rotation thereto, said cutting blade projecting out of the tubular cutting edge into the cavity of the upper cup;
— said discharge chamber for the sucked juice and pulp being connected, with the interposition of suitable screening means, with a vacuum chamber inside which depression is created, suitable compression means being provided to compress the pulp and juice, whereby the purified juice passes through the screening means into the vacuum chamber, while the exhausted pulp is eventually discharged by the compression means.

4. A device for processing whole citrus fruit comprising:
— an upper cup arranged with its axis vertical and having a bowl-like cavity directed downwardly;
— a lower cup coaxial with said upper cup and having a bowl-like cavity directed upwardly;
— each of said bowl-like cavities having a multiplicity of narrow ribs separated by correspondingly narrow slots, the ribs of each cup being aligned with the slots of the opposite cup;
— a tubular cutting edge;
— rotary rupturing means arranged within said tubular cutting edge and capable of extending a substantial length into the cavity of the said stationary upper cup;
— suction means being provided to exert suction within said tubular cutting edge;
— means for moving the lower cup towards and away from said upper cup, said tubular cutting edge being arranged at the center of the upper cup so that upon upward movement of said lower cup said cutting edge makes a neat incision in the peel of said citrus fruit and establishes a tight seal connection between the interior of the fruit and the suction means;
— said suction means comprising a stationary stator made of elastic material having a helically shaped hollow cavity passing therethrough, one end of said cavity communicating with the tubular cutting edge, and the opposite end with a discharge chamber for the sucked juice and pulp, and a rotor, rotatably mounted inside said cavity of the stator, the axis of rotation of which is vertical and coincident with the axis of the upper cup, said rotor carrying at its lower end a cutting blade integral in rotation thereto, said cutting blade projecting out of the tubular cutting edge into the cavity of the upper cup;
— said discharge chamber for the sucked juice and pulp being connected, with the interposition of suitable screening means, with a vacuum chamber inside which depression is created, suitable compression means being provided to compress the pulp and juice, whereby the purified juice passes through the screening means into the vacuum chamber, while the exhausted pulp is eventually discharged by the compression means;
— said screening means consisting of a tubular perforated jacket and the compression means consisting of an endless screw feeder rotating inside said tubular perforated jacket, the inlet of said tubular jacket being connected to the discharge chamber for the sucked pulp and juice, and the outlet being connected to final discharge means for the exhausted pulp, said jacket being surrounded by a vacuum chamber for collecting the purified juice.

* * * * *